(12) United States Patent
Bovero et al.

(10) Patent No.: US 10,753,729 B2
(45) Date of Patent: Aug. 25, 2020

(54) PHOTONIC SENSING ANALYTICAL DEVICE

(71) Applicants: Saudi Arabian Oil Company, Dhahran (SA); BlueBridge Technologies Ltd., Dublin (IE)

(72) Inventors: Enrico Bovero, Dhahran (SA); Hawraa Bin Saad, Dhahran (SA); Timothy Briggs, Dublin (IE); Daniel Linehan, Dublin (IE)

(73) Assignees: Saudi Arabian Oil Company, Dhahran (SA); BlueBridge Technologies Ltd., Dublin (IE)

( * ) Notice: Subject to any disclaimer, the term of this patent is extended or adjusted under 35 U.S.C. 154(b) by 0 days.

(21) Appl. No.: 16/149,809

(22) Filed: Oct. 2, 2018

(65) Prior Publication Data

US 2020/0103222 A1 Apr. 2, 2020

(51) Int. Cl.
*G01B 11/16* (2006.01)

(52) U.S. Cl.
CPC .................. *G01B 11/165* (2013.01)

(58) Field of Classification Search
CPC ... H04N 5/2254; H04N 5/2257; G01B 11/165
USPC ....................................................... 356/320
See application file for complete search history.

(56) References Cited

U.S. PATENT DOCUMENTS

| | | |
|---|---|---|
| 5,576,833 A | 11/1996 | Miyoshi et al. |
| 5,640,237 A | 6/1997 | Esrig et al. |
| 5,777,729 A | 7/1998 | Aiyer et al. |
| 5,905,572 A | 5/1999 | Li |
| 6,047,083 A | 4/2000 | Mizuno |
| 6,067,153 A | 5/2000 | Mizuno |

(Continued)

FOREIGN PATENT DOCUMENTS

DE 102015012296 A1 3/2017

OTHER PUBLICATIONS

M. Lipowicz, et al. "Handheld Device Adapted to Smartphone Cameras for the Measurement of Sodium Ion Concentrations at Saliva-Relevant Levels via Fluorescence" Bioengineering 2, 122-138 (2015).

(Continued)

*Primary Examiner* — Roy M Punnoose
(74) *Attorney, Agent, or Firm* — Leason Ellis LLP

(57) ABSTRACT

A device for detecting and determining deformations on a structure surface containing diffractive stress indicator elements comprises a portable computing device having a camera, a processor, a memory, and a display screen, and a casing for conformably enclosing the portable computing device. In one embodiment, the casing includes an elongated light source, a first window positioned to provide access to the display screen of the portable computing device, and a second window positioned to allowing the light source to emit a band of light outside of the casing, and a port hole aligned with the camera of the portable computing device. When the device is positioned proximate to the structure, the elongated light source emits a band of illumination onto the diffractive stress indicator elements, the diffractive elements diffract the emitted radiation and the camera of the portable computing device receives at least a portion of the diffracted radiation.

11 Claims, 5 Drawing Sheets

(56) References Cited

U.S. PATENT DOCUMENTS

| | | | |
|---|---|---|---|
| 6,268,093 | B1 | 7/2001 | Kenan et al. |
| 6,421,164 | B2 | 7/2002 | Tearney et al. |
| 7,075,072 | B2 | 7/2006 | Hatakeyama et al. |
| 7,262,850 | B2 | 8/2007 | Dettmann et al. |
| 7,269,280 | B2 | 9/2007 | Hiroi et al. |
| 7,359,057 | B2 | 4/2008 | Schwiesow |
| 8,279,544 | B1* | 10/2012 | O'Neill ............ G02B 7/14 359/827 |
| 8,760,569 | B2* | 6/2014 | Yang ............ G06F 1/1632 348/373 |
| 9,294,660 | B2* | 3/2016 | O'Neill ............ H04N 5/2254 |
| 9,442,346 | B2* | 9/2016 | Gantz ............ A45C 11/00 |
| 9,571,151 | B2* | 2/2017 | O'Neill ............ H04B 1/3888 |
| 10,012,888 | B1* | 7/2018 | Penaflor ............ H04M 1/026 |
| 10,148,799 | B2* | 12/2018 | O'Neill ............ H04B 1/3888 |
| 2003/0174211 | A1 | 9/2003 | Imaoka ............ H04M 1/0266 348/156 |
| 2007/0046936 | A1 | 3/2007 | Mauzy et al. |
| 2007/0122145 | A1* | 5/2007 | Chang ............ G02B 13/009 396/529 |
| 2009/0093274 | A1* | 4/2009 | Yamamoto ........ G02B 13/0015 455/566 |
| 2010/0144394 | A1* | 6/2010 | Han ............ H04M 1/0272 455/566 |
| 2011/0085157 | A1 | 4/2011 | Bloss et al. |
| 2012/0077548 | A1* | 3/2012 | Goldberg ............ G06F 1/1626 455/567 |
| 2014/0055978 | A1* | 2/2014 | Gantz ............ A45C 11/00 362/8 |
| 2014/0078594 | A1* | 3/2014 | Springer ............ G02B 7/16 359/672 |
| 2015/0042904 | A1* | 2/2015 | Shiraishi ............ H04M 1/0266 349/12 |
| 2015/0172522 | A1 | 6/2015 | O'Neill et al. |
| 2015/0276187 | A1* | 10/2015 | Shoemake ............ F21V 21/00 362/235 |
| 2016/0012269 | A1 | 1/2016 | Kowalczyk et al. |
| 2016/0209025 | A1* | 7/2016 | Matthews ............ F21L 4/04 |
| 2016/0294996 | A1* | 10/2016 | Yen ............ H04M 1/04 |
| 2016/0314374 | A1* | 10/2016 | Braumandl ............ G07D 7/121 |
| 2016/0321485 | A1 | 11/2016 | Utykanski et al. |
| 2017/0192339 | A1 | 7/2017 | Keiji et al. |
| 2017/0276614 | A1 | 9/2017 | Bovero et al. |
| 2017/0324438 | A1* | 11/2017 | Mischel ............ H04N 5/2257 |
| 2018/0135815 | A1* | 5/2018 | Rowles ............ G03B 15/03 |
| 2019/0243214 | A1* | 8/2019 | Penaflor ............ G03B 15/05 |

OTHER PUBLICATIONS

S. Sainov, "Optical Sensor Based on Total Internal Reflection Diffraction Grating", Sensors and Actuators A: Physical, 1994, 45, 1.

X Wang, et al., "Two-dimentsional displacement sending using a cross diffraction grating scheme", Opt. A: Pure Appl. Opt. 2004, 6.

J. Y. Lin, et al. "Optical strain sensor based on diffraction grating and surface plasmon resonance heterodyne interferometer", Sensors and Actuators A: Physical, 2013, 193, 233.

W. C. Wang, et al., Progress in Electromagnetics Research Symposium, 2005, Hangzhou, China, Aug. 22-26.

International Search Report and Written Opinion in Correspond PCT Application No. PCT/US19/54262 dated Jan. 17, 2020. 13 pages.

* cited by examiner

PHOTONIC SENSING ANALYTICAL DEVICE

FIELD OF THE INVENTION

The present invention relates to inspection of structures for deformation, and, more particularly, relates to an inspection device adapted for the detection of deformations on structures having embedded photonics structures.

BACKGROUND OF THE INVENTION

Previously filed and commonly-assigned U.S. patent application Ser. No. 15/082,327 ("the '327 application"), entitled "Systems and Methods for Constructing and Testing Composition Photonic Structures," which is incorporated by reference in its entirety herein, discloses a method of embedding stress indicator elements in the surfaces of structures to aid in determining ongoing stresses and/or deformations of the structure. The stress indicator elements can include an optical diffraction grating (e.g., photonic crystal, fiber Bragg grating) and, optionally, one or more fluorophore materials. The stress indicator elements are arranged so that deformation of the surface caused by, for example and without limitation, tensile stress, compressive stress, bending, temperature variations, and chemical composition changes or other material defects, changes the periodicity of the grating. When light is directed onto the structure including the stress indicator elements, light is diffracted by the elements into a pattern that corresponds to the periodicity of the grating. Changes in the periodicity caused by stresses and variations alter the diffraction pattern by shifting the wavelength of radiation at a particular angle of diffraction according to the well-known grating equation.

FIG. 1 shows an example embedded stress indicator element 10 disclosed in the '327 application. The element includes periodic components e.g., 12, 14, 16, each of which diffract wavelengths of light in varying angular modes (numbered m=0 through m=3). The periodic components of the stress indicator element, which can have a variety of shaped profiles, including sinusoidal, sawtooth, triangular, etc., include peak and valley features. The indicator elements are designed so that respective peaks and valleys of adjacent periodic features are a regular distance (d) apart. Deformations in the underlying structure will alter the inter-feature distance (d) of at least a portion of the components, which will, in turn affect the angle at which such altered components diffract incoming light.

While specialized detection and processing equipment can be used in this context for detecting radiation diffracted from the embedded elements in the structure and determining the deformation therefrom, such equipment can be cumbersome to transport to distant locations and difficult to set up in locations that have limited accessible space.

It would be useful to utilize the considerable processing capabilities of smart phones and tablets, which can be easily carried by field technical personnel to various sites and locations, in the performance of structural deformation detection. The present invention addresses these and other needs in the art.

SUMMARY OF THE INVENTION

Embodiments of the present invention provide a device for detecting and determining deformations on a structure surface containing diffractive stress indicator elements. The device comprises a portable computing device having a camera, a processor, a memory, and a display screen, and a casing for enclosing the portable computing device. The casing includes an elongated light source, a first window positioned to provide access to the display screen of the portable computing device, and a second window positioned to allowing the light source to emit a band of light outside of the casing, and a port hole aligned with the camera of the portable computing device. When the device is positioned proximate to the structure, the elongated light source emits a band of illumination onto the diffractive stress indicator elements, the diffractive elements diffract the emitted radiation and the camera of the portable computing device receives at least a portion of the diffracted radiation.

In some implementations, the portable computing device comprises a smart phone (e.g., Samsung, iPhone) or a tablet computer. In certain embodiments, the casing further comprises an objective lens positioned in front of the camera port hole and aligned with the camera of the portable computing device which is adapted for magnifying the received diffracted radiation.

The memory of the portable computing device comprises hardware configured to store instructions for the processor to execute an application for determining deformation of the structure based on the diffracted radiation received by the camera. In certain embodiments, the application for determining deformation produces a color map of distance based on pixel hue and, in some implementations, further transforms the color map of distance into a three-dimensional surface and performs averaging operations over an illuminated space to highlight short-range deformation data.

The light source is preferably tilted with respect to a plane of the device for the purpose of illuminating an elongate, rectangular section of the structure surface. In certain embodiment, the light source is tilted at about 60° with respect to the plane of the device. The light source can extend for approximately an entire width of the casing.

Embodiments of the present invention also provide a casing for use with a standard portable computing device to facilitate detection and determination of deformations on a structure surface containing diffractive stress indicator elements. The casing can comprise a generally planar casing base having dimensions for conformably fitting the portable computing device, the casing base includes an elongated light source, a window for the light source, and a port hole for a camera of the portable computing device. The casing also can comprise a generally planar casing front adapted to securely coupled to the casing base and enclose the portable computing device. The casing front has a window for enabling access to a first window positioned to provide access to a display screen of the portable computing device. When the casing is assembled, enclosing the portable computing device, and is positioned proximate to the structure, the elongated light source emits a band of illumination onto the diffractive stress indicator elements, the diffractive elements diffract the emitted radiation and the camera of the portable computing device receives at least a portion of the diffracted radiation.

In certain embodiments, the base further includes an objective lens positioned to align with the port hold for the camera. The base can further include a recess along a rim of the base enabling an operator to grip the casing without obstructing the light source or the objective lens.

In certain implementations, the casing can further comprise a battery for providing electrical power to the light source. The casing can also comprise a protruding switch coupled to the base and in removable contact with a power switch of the portable computing device, enabling the portable computing device to be activated or deactivated through the casing base. Another protruding switch can be provided, which is coupled to the base, which is in removable contact with electrical contacts for providing power to the light source, and which can enable the portable light source to be turned on or off through the casing base.

In still other implementations, a device for detecting and determining deformations on a structure surface containing diffractive stress indicator elements comprises portable computing device of the type having a camera, a processor, a memory, and a display screen, code executing in the processor which configures the processor to emit a band of illumination onto the diffractive stress indicator elements and to receive at least a portion of the diffracted radiation when the device is positioned proximate to the diffractive stress indicator elements, and a casing configured to support the portable computing device in a secure manner. The casing includes an elongated light source configured to emit the band of light beyond the casing and toward the diffractive stress indicator elements, and a port hole aligned with the camera of the portable computing device. Optionally, the casing further comprises an objective lens positioned in front of the camera port hole and aligned with the camera of the portable computing device.

These and other aspects, features, and advantages can be appreciated from the following description of certain embodiments of the invention and the accompanying drawing figures and claims.

DETAILED DESCRIPTION CERTAIN OF EMBODIMENTS OF THE INVENTION

A device for detecting diffracted radiation from a structure ("detection device) and determining deformation of the structure from the diffracted radiation is disclosed herein. The device includes a casing with a form factor adapted for housing a portable computing device, and a computing device enclosed within the casing. Also included within the casing are an elongated light source for emitting light toward a structure having embedded stress indicator elements, and an objective lens. The computing device housed within the casing can be a smart phone or tablet equipped with a camera positioned to align with the objective lens. Light emitted by the light source onto the structure is diffracted by the stress indicator elements. This light is received at the objective lens of the casing and then directed to the camera of the computing device which records images of the received diffracted radiation. The computing device can then process the image data and determine deformation of the underlying stress indicator elements.

Figure 2:
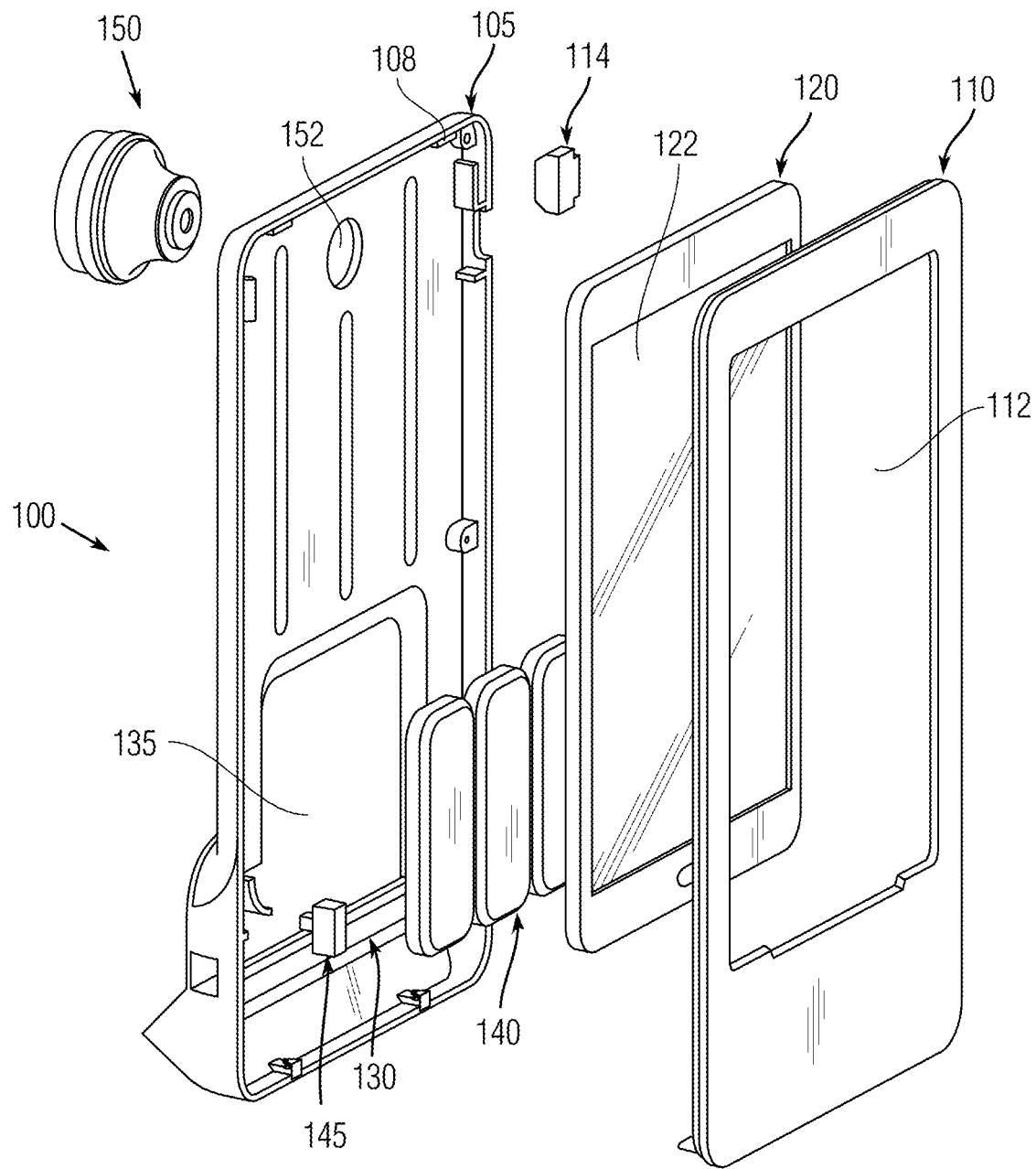
FIG. 2 is an exploded view of an embodiment of the detection device according to the present invention.

FIG. 2 is an exploded view of an embodiment of the detection device 100 according to the present invention. The device 100 includes a casing which in the exploded view is shown as two separate components, a casing base 105, and a casing front 110. The casing base 105 and front 110 can be made from any durable, robust materials used in the art such as polycarbonate or polypropylene plastics. The casing can be molded to conform to the dimensions of a standard or specific smart phone, tablet or other portable computing device. The casing base 105 can have an ergonomic design to allow for a convenient handling. For example, the rear side of the casing base can include recesses, grooves or depressions to facilitate a firm and comfortable grip. The casing base and front can be securely coupled together by a snap fit connection by mating elements on each component. Alternatively, fasteners such as screws and pins can be used to securely assemble the casing.

Furthermore, in an alternative implementation, the casing base 105 can be configured to grip or otherwise support the portable computing device 120 in a secure manner without the need for a casing front 110 or window 112 (discussed next). In this alternative implementation, the casing base 105 includes fingers or a seat arranged to contact the sides or the front face of the portable computing device 120 so as to preclude dislodgment of the portable computing device from the casing base 105.

Figure 1:
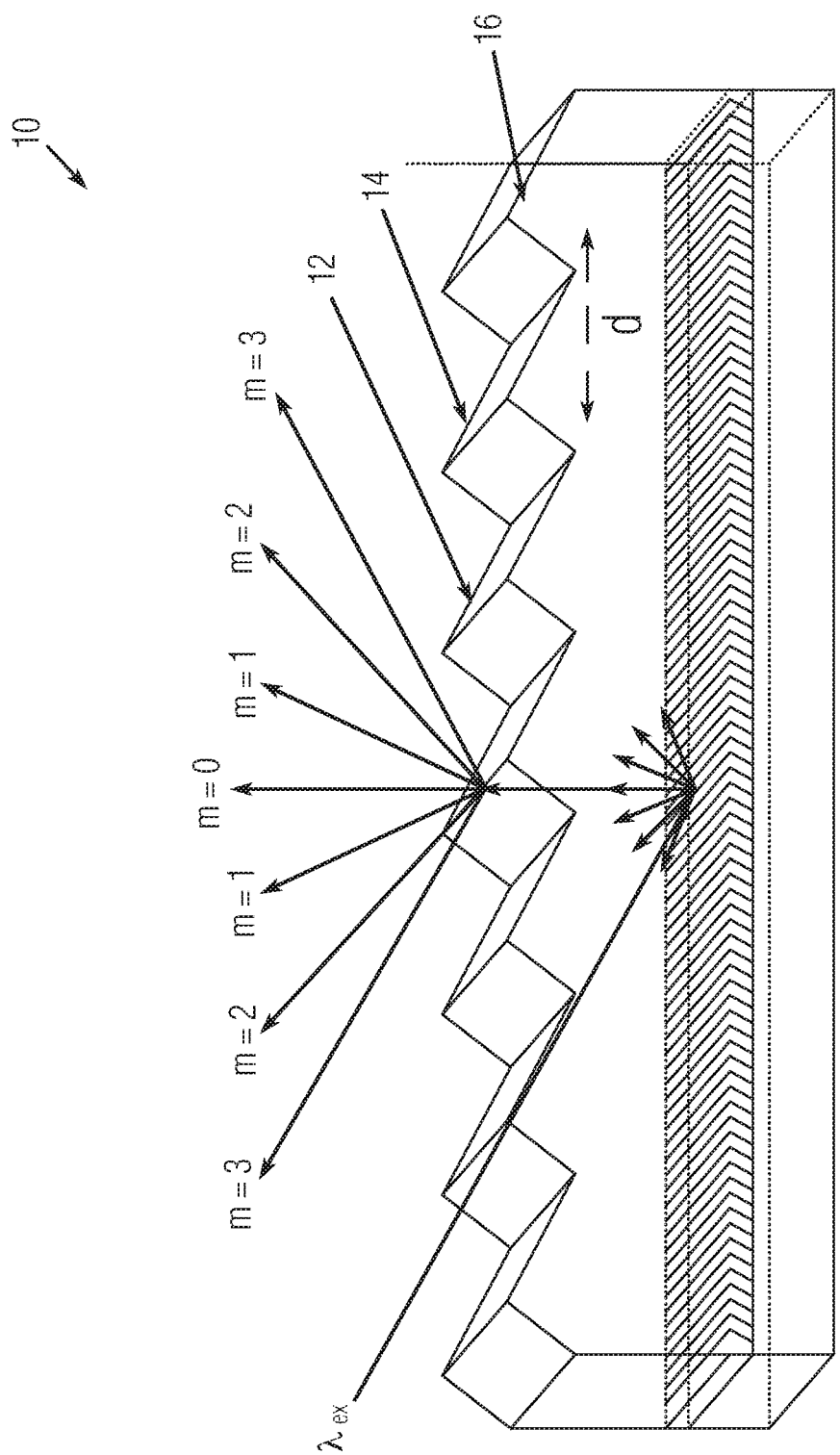
FIG. 1 is a schematic perspective view of an embedded stress indicator element as disclosed in the commonly-assigned '327 application which is utilized by the detection device according to the present invention.

A portable computing device 120, such as a smart phone, tablet, PDA or other similar device is positioned to fit between the casing base 105 and casing front 110. The front side of the computing device 120 includes a display screen interface 122, and the rear side of the computing device includes a camera port (obscured in FIG. 1). The computing device also comprises all other standard components used in commonly-used smart phone and tablet devices including communication modules and ports, processing units, power and memory components, among other standard components. The casing front 110 has a large window 112 which corresponds in dimensions to the display screen (and activation buttons) of the computing device such that when the computing device 120 is mounted in the casing, the display screen is exposed and can be viewed and controlled by field technical personnel. The computing device can be activated or deactivated while enclosed in the casing via a power switch 114 which protrudes from the casing and contacts the power switch of the computing device when pressed.

The casing base 105 includes a light source 130 which can comprise one or more light emitting diodes (LEDs) arranged in a linear, elongated configuration toward the bottom of the casing. In some implementations, the light source 130 extends approximately the entire width of the casing. The light source 130 can also include a diffuser to reduce and/or even out the intensity of the light emitted by the LEDs. Light source 130 preferably emits white light in the visible spectrum, but can also optionally emit radiation outside of the visible spectrum. White light, as is well known, is composed of multiple component wavelengths, and decomposes into the component wavelengths upon interaction with a diffractive medium. To enable light from the source to be emitted externally from the device, the casing base 105 also has a light emission window 135 positioned proximate to and above the light source.

The light source 130 is provided with electrical power by a battery pack 140 situated proximate to electrical leads coupled to the light source. The light source 130 can be activated or deactivated using a switch 145 that protrudes from the casing base. The light source 130 is tilted upward at an angle with respect to the plane of the casing. In some embodiments, the tilt angle is about 60°, although other angles can be used. The tilt angle is designed to illuminate an elongated area on the surface of an investigated structure in the view of the camera of the computing device 120. As a further aid to the computing device 120, the casing base includes an objective lens 150 positioned at the top of the casing in front of the camera port of the computing device. The casing base includes a port hole 152 for fitting the objective lens in relation to the camera port of the computing device. In some implementations, the objective lens 150 has a magnification of about 3×, but lenses with other magnification parameters can be used. The casing base also includes charging ports (not shown in FIG. 2) for the battery 140 and computing device 120.

The casing approximately matches the dimensions of the portable computing device 120 and can be, for example, about 6 to about 12 inches long, and about 4 to about 7 inches wide, although larger or smaller cases can be used for correspondingly larger or smaller devices, as required. Additionally, the casing, including the additional light source, lens and battery components, does not add a significant amount of weight beyond the weight of the computing device, so that the detection device as a whole remains light and easy for operators to use.

Figure 4:
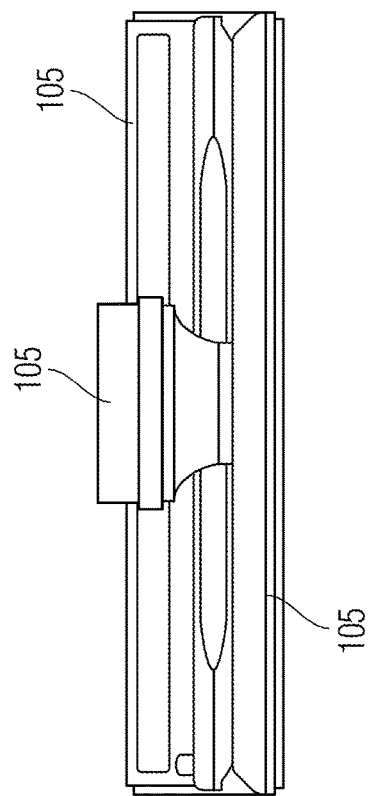
FIG. 4 is a top view of an embodiment of the detection device according to the present invention.
Figure 3:
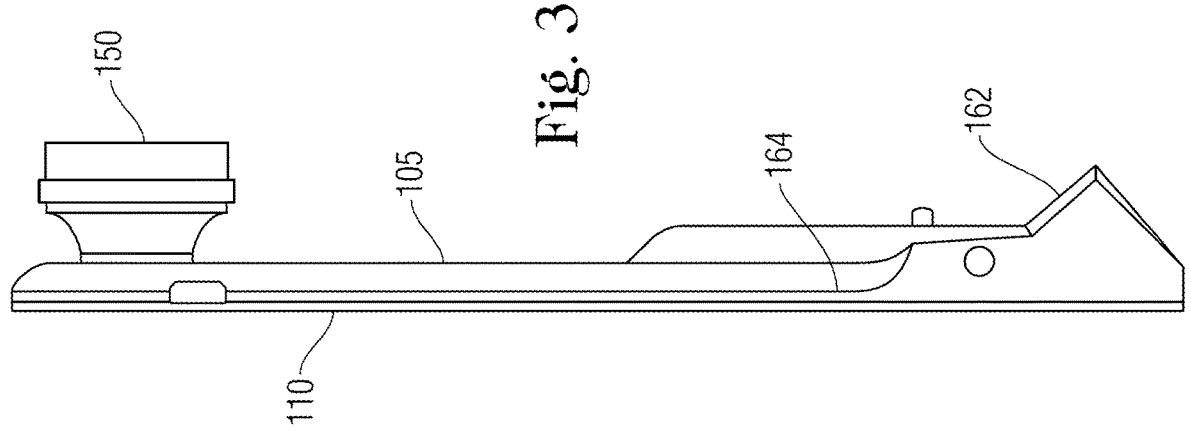
FIG. 3 is a side view of an embodiment of the detection device according to the present invention.
Figure 5:
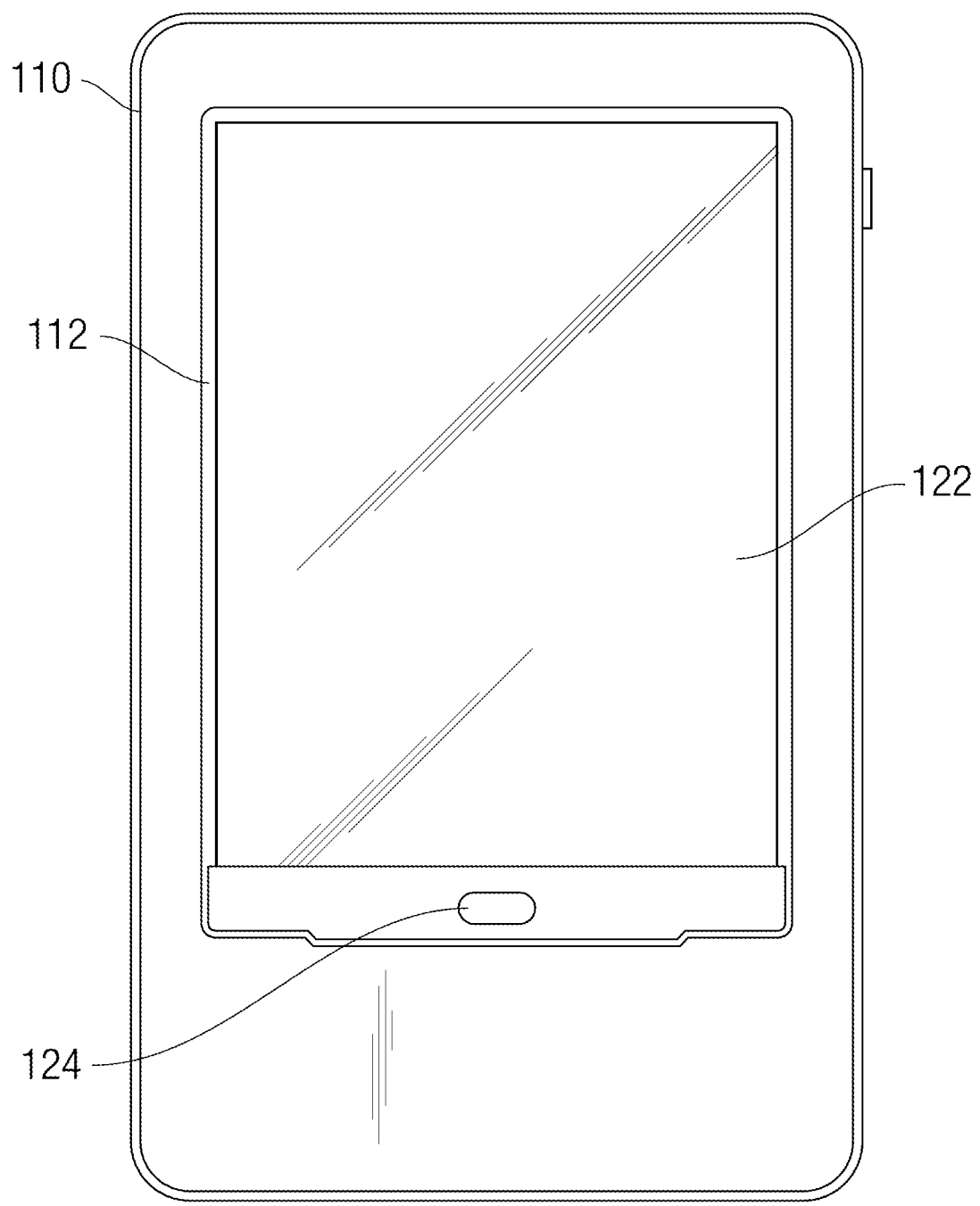
FIG. 5 is a front view of an embodiment of the detection device according to the present invention.

FIG. 3 is a side view of an embodiment of the detection device according to the present invention, as assembled. In this view it can be discerned that the device according to this embodiment has a substantially planar in shape. The objective lens 150 extends perpendicular to the plane of the device at the top, and at the bottom of the device, there is a protruding, angled section 162 in which the light source of the device is positioned. A recess 164 along the side rim on the casing base is an ergonomic feature that aids device operators hold the device without interfering with the light-generating and receiving components of the device. Alternatively, the casing base can include a raised side edge to facilitate gripping without obstructing the light source or objective lens. FIG. 4 is a top view of the embodiment of the detection device shown in FIGS. 2 and 3. This view illustrates the compactness of the device design. FIG. 5 is a plan view of the casing front 110. The view of FIG. 5 clearly illustrates the window 112 in the casing that allows operators access to the display screen 122 and control button 124 of the portable computing device 120.

During operation, the device is positioned a suitable distance from the structure to be investigated. For example, the device can be placed about 5 cm to about 50 cm, or more typically, about 25 to about 35 cm from the surface of the structure. At such distances, the elongated light source of the device can cast an elongated band of illumination onto the structure surface of sufficient size for detection. The light source 130 of the device can be oriented with respect to the structure so that the elongated band of illumination is oriented parallel with respect to periodic features of the stress indicator elements embedded in the structure.

Figure 6:
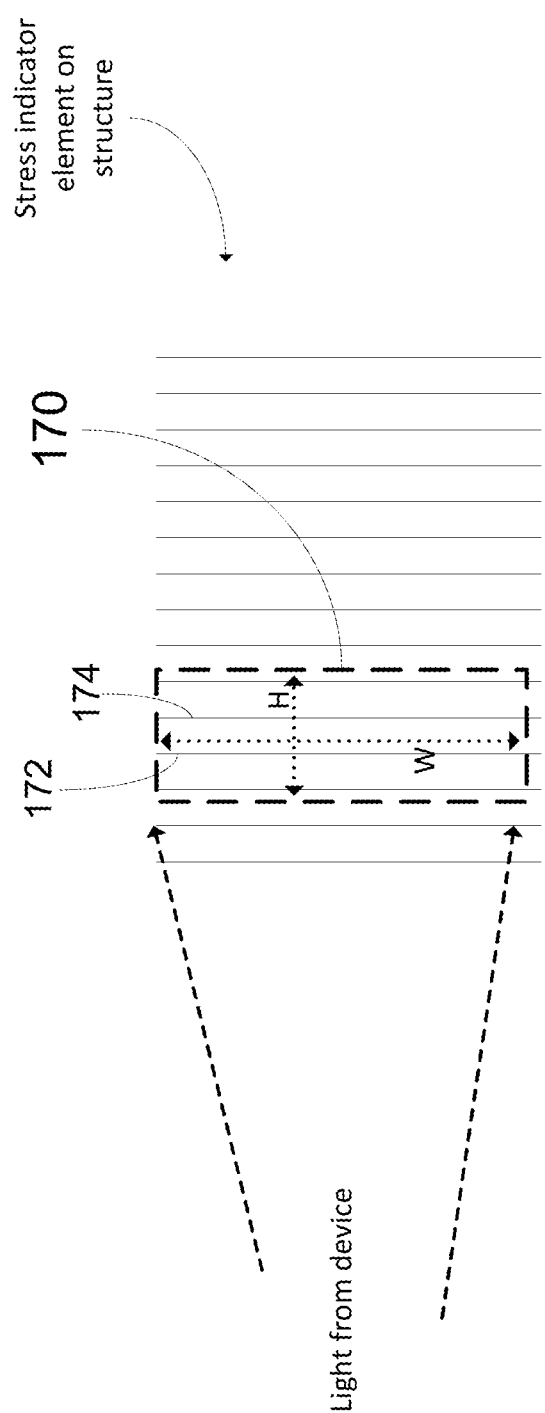
FIG. 6 is a schematic illustration of an illumination band generated by the light source of the detection device according to the present invention on an investigated structure

The elongated band of illumination appears, when viewed in the camera, as an iridescent rectangle in which colors change perpendicularly with respect to the elongated axis of the illumination band. FIG. 6 is a schematic illustration of the illumination band 170 over a section of the structural surface having a plurality of groove features (e.g., 172, 174). The width of the illumination band (W) is measured along the elongated axis and is proportional to the length of the light source and the distance between the light source and the illuminated surface. The height (H) is measured transverse to the elongated axis. The distance (d) between the groove features is a known attribute of the investigated structure.

The distance between the light source and the structure surface is one of the factors used in the grating equation to determine deformation of the indictor elements. However, since the spacing between the grooves of the photonic material is known, the determination of deformation can be made by utilizing unperturbed areas of the structural surface as reference points. As a result, the distance between the device and structure surface does not need to be precisely maintained, and the device can operate effectively at a range of distances from the structure surface.

The use of light source that emits in the visible spectrum is advantageous for several reasons. Use of visible light allows the illumination band to be seen and observed in the field by the device operator, and adjusted if and when required. Additionally, the level of performance of the visible spectrum detectors (e.g., camera pixel sensors) tends to be higher than detectors for radiation outside of the visible range. Moreover, visible spectrum detectors also tend to be much less costly, as they are incorporated in standard electronic devices and mass produced.

A process for determining deformation in the investigated structure is described as follows. When the device is placed in position to emit light onto the surface of an investigated structure, a substantial amount of the emitted radiation is diffracted and decomposed into its components depending on the angle of incidence and of reflection. The diffracted radiation is captured by the camera through the objective lens, which magnifies the resolution of the captured images and measurements (e.g., by 3 times). The pixel sensors of the camera record an iridescent rectangle corresponding to the illuminated band in which the color (wavelength) is constant along the short side and changes along the elongated side. The image collected by the camera is then processed by the computing device, which is capable of transforming the color information into structural displacement data. The camera sensors that are installed in most up-to-date smart phone and tablet devices that include pixel sensors with sufficient sensitivity in the visible spectrum to detect the vast majority of deformations of interest, which are mostly in the micrometer and sub-micrometer range.

Examples of methods for transforming the pixel color (wavelength) data into displacement data are described in the '327 described above, and also in commonly-owned U.S. patent application Ser. No. 15/661,571 (the '571 application), entitled "System and Method for Image Processing and Feature Recognition." The '571 application is also incorporated by reference herein in its entirety. As these applications disclose, the hue of each pixel sensor in the camera can be transformed into a wavelength. The wavelengths can then be used to determine displacement between the periodic features of the stress indicator elements using the grating equation. The "image" captured by the camera can be considered a hue color map using one or more software applications stored on the portable computing device. Each value in the hue map is transformed into a first approximation or "color map" of the distance between the periodic features on the surface of the material. Other inputs to the grating equation include the angle of incidence, the angle of diffraction, and the distance between the device and the stress indicator element of the structure (the distance between the light source and the camera sensor is known and fixed). Since the device is hand-held during operation, and subject to some variation in placement, it is not expected that exact values of the device-to-structure distance be determined. Instead, because the baseline value of the spacing between periodic features is known, relative distance measurements can be converted to absolute distance measurements based on the known spacing.

However, at this first iteration, the color map does not reflect the actual variation in distance or material displacement, because the variation in the hue map depends on the angle of observation. In order to account for the angle of observation, the procedure disclosed in the '571 application can be utilized, in which the color maps (of wavelength or distance) are converted to a three-dimensional surface. The value of hue or distance is plotted on the z axis and the surface is divided into an integer number of rectangles with the same aspect ratio as the entire image. Each rectangle is then subdivided into triangles, and using the vertices of these triangles, triangular planes are calculated and then subtracted from the overall surface. The result, after a number of iterations, is a generally flat in which only short-range color variations remain. When this procedure is performed on the distance color map, the zero value (on the z-axis) of the flattened surface corresponds to a zero-deformation baseline. All values that are above or below the plane correspond to extensions or compressions of the structural material, respectively.

The deformation determination application executed on the portable computing device can be configured to identify values of distance that exceed a certain threshold in terms of distance from the mean value after the flattening operation. The threshold values can be set by the operator and changed during operation. From the values that exceed a threshold, local maxima and minima can also be identified allowing the operator to focus on areas that have a particularly high magnitude of deformation.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A casing for use with a portable computing device of a type having a housing, camera, processor, memory and a display screen support by the housing configured to detect and determine deformations on a structure surface containing diffractive stress indicator elements, the casing comprising:
    a port hole adjacent a first end of the casing an aligned with the camera of the portable computing device;
    an integral protruding section adjacent an opposite, second end of the case on the same side thereof, the protruding section having an angled face inclined toward the first end;
    a first window positioned to provide access to the display screen of the portable computing device; and
    a light source positioned within the protruding section and positioned below a second window therein which enables the light source to emit a band of light outside of the casing;
    wherein the casing encloses the housing of the portable computing device, and
    wherein, when the casing is positioned proximate to the structure, the light source emits a band of illumination onto the diffractive stress indicator elements, the diffractive elements diffracting the emitted radiation and the camera of the portable computing device receiving at least a portion of the diffracted radiation.

2. The device of claim 1, wherein the computing device is one of a smart phone and a tablet computer.

3. The device of claim 1, wherein the casing further comprising an objective lens positioned in front of the camera port hole and aligned with the camera of the portable computing device.

4. The device of claim 1, wherein the memory of the portable computing device stores instructions for the processor to execute an application for determining deformation of the structure based on the diffracted radiation received by the camera.

5. The device of claim 4, wherein the application for determining deformation produces a color map of distance based on pixel hue.

6. The device of claim 5, wherein the application for determining deformation further transforms the color map of distance into a three-dimensional surface and performs averaging operations over an illuminated space to highlight short-range deformation data.

7. The device of claim 1, wherein the light source is tilted at about 60° with respect to the plane of the device.

8. The device of claim 1, wherein the light source extends for approximately an entire width of the casing.

9. The casing of claim 1, wherein the casing has a depth in which the portable computing device is received, and the depth of the casing is increased at the integral protruding section.

10. A device for deformations on a structure surface containing diffractive stress indicator elements, the device comprising:
- a portable computing device having a camera, a processor, a memory, and a display screen;
- a casing configured to support the portable computing device in a secure manner, the casing including:
- a port hole adjacent a first end of the casing an aligned with the camera of the portable computing device;
- an integral protruding section adjacent an opposite, second end of the case on the same side thereof, the protruding section having an angled face inclined toward the first end;
- a first window positioned to provide access to the display screen of the portable computing device; and
- a light source positioned within the protruding section and positioned below a second window therein which enables the light source to emit a band of light outside of the casing;
- wherein the casing encloses the housing of the portable computing device, and
- wherein, when the casing is positioned proximate to the structure, the light source emits a band of illumination onto the diffractive stress indicator elements, the diffractive elements diffracting the emitted radiation and the camera of the portable computing device receiving at least a portion of the diffracted radiation.

11. The device of claim 10, wherein the casing further comprising an objective lens positioned in front of the camera port hole and aligned with the camera of the portable computing device.

* * * * *